United States Patent
Zidenberg et al.

(10) Patent No.: US 10,917,362 B1
(45) Date of Patent: *Feb. 9, 2021

(54) ASSISTED SIDEBAND TRAFFIC MANAGEMENT

(71) Applicant: Amazon Technologies, Inc., Seattle, WA (US)

(72) Inventors: Tzachi Zidenberg, Kfar Hasidim (IL); Barak Wasserstrom, Mitzpe Aviv (IL); Guy Zalik, Yokne'am Illit (IL)

(73) Assignee: Amazon Technologies, Inc., Seattle, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/009,141

(22) Filed: Jun. 14, 2018

Related U.S. Application Data

(63) Continuation of application No. 14/979,319, filed on Dec. 22, 2015, now Pat. No. 10,003,554.

(51) Int. Cl.
*H04L 12/947* (2013.01)
*H04L 12/935* (2013.01)

(52) U.S. Cl.
CPC .............. *H04L 49/25* (2013.01); *H04L 49/30* (2013.01)

(58) Field of Classification Search
CPC .................................................. H04L 12/947
See application file for complete search history.

(56) References Cited

U.S. PATENT DOCUMENTS

| | | |
|---|---|---|
| 10,003,554 B1 | 6/2018 | Zidenberg et al. |
| 2003/0046330 A1 | 3/2003 | Hayes et al. |
| 2004/0179546 A1 | 9/2004 | McDaniel et al. |
| 2006/0089750 A1 | 4/2006 | Basham et al. |
| 2006/0092853 A1 | 5/2006 | Santoso et al. |
| 2007/0127491 A1 | 6/2007 | Verzijp et al. |
| 2008/0170498 A1* | 7/2008 | Shah ............... H04L 41/0273 370/230 |
| 2008/0239956 A1 | 10/2008 | Okholm et al. |
| 2012/0134320 A1 | 5/2012 | Khawer et al. |
| 2014/0280841 A1 | 9/2014 | Kamble et al. |
| 2015/0071292 A1 | 3/2015 | Tripathi et al. |
| 2015/0370590 A1 | 12/2015 | Warkentin et al. |
| 2015/0378930 A1 | 12/2015 | Anderson et al. |
| 2016/0277254 A1* | 9/2016 | Tripathi ............. H04L 12/4641 |

(Continued)

OTHER PUBLICATIONS

U.S. Appl. No. 14/979,319, "Final Office Action", dated Oct. 3, 2017, 21 pages.

(Continued)

*Primary Examiner* — Sulaiman Nooristany
(74) *Attorney, Agent, or Firm* — Weaver Austin Villeneuve & Sampson LLP

(57) ABSTRACT

Disclosed is a network device, comprising a first network interface port, a second network interface port, and a processor coupled to the first network interface port and the second network interface port. The processor can be configured to operate in a first switching mode to receive network control packets via the first network interface port and transmit the received network control packets via the second network interface port. The processor can also be configured operate in a second communications mode to receive and transmit network communication packets using the first network interface independently of the operation in the first switching mode.

17 Claims, 9 Drawing Sheets

(56) References Cited

U.S. PATENT DOCUMENTS

2016/0283747 A1    9/2016  Subbareddy et al.
2017/0032119 A1*   2/2017  Dore .................... H04L 9/3247

OTHER PUBLICATIONS

U.S. Appl. No. 14/979,319 , "Non-Final Office Action", dated May 26, 2017, 20 pages.
U.S. Appl. No. 14/979,319 , "Notice of Allowance", dated Feb. 22, 2018, 6 pages.
U.S. Appl. No. 14/979,319 , "Assisted Sideband Traffic Management ", filed Dec. 22, 2015.

* cited by examiner

ASSISTED SIDEBAND TRAFFIC MANAGEMENT

CROSS REFERENCE TO RELATED APPLICATIONS

This application is a continuation of U.S. patent application Ser. No. 14/979,319, filed Dec. 22, 2015, and issued as U.S. Pat. No. 10,003,554 on Jun. 19, 2018, entitled "ASSISTED SIDEBAND TRAFFIC MANAGEMENT", the content of which is herein incorporated in its entirety.

BACKGROUND

Computer networks and networks devices are becoming ubiquitous in modern economies and societies. Computer networks are used for communication, financial transactions, scientific studies, and to facilitate other desires of our society. As these computer networks are becoming more prevalent, the need has increasingly grown for reliable and efficient network devices to service the transportation of data across various computer networks.

Many techniques have been implemented in order to increase the reliability, serviceability, and redundancy of computer networks. One such technique is to utilize control messages to control low level functionality of network devices of the computer network. These control messages can be insulated from the general communication network traffic to allow access to the network even when general communication network traffic cannot be used.

BRIEF DESCRIPTION OF THE DRAWINGS

Various embodiments in accordance with the present disclosure will be described with reference to the drawings, in which.

DETAILED DESCRIPTION

Figure 1:
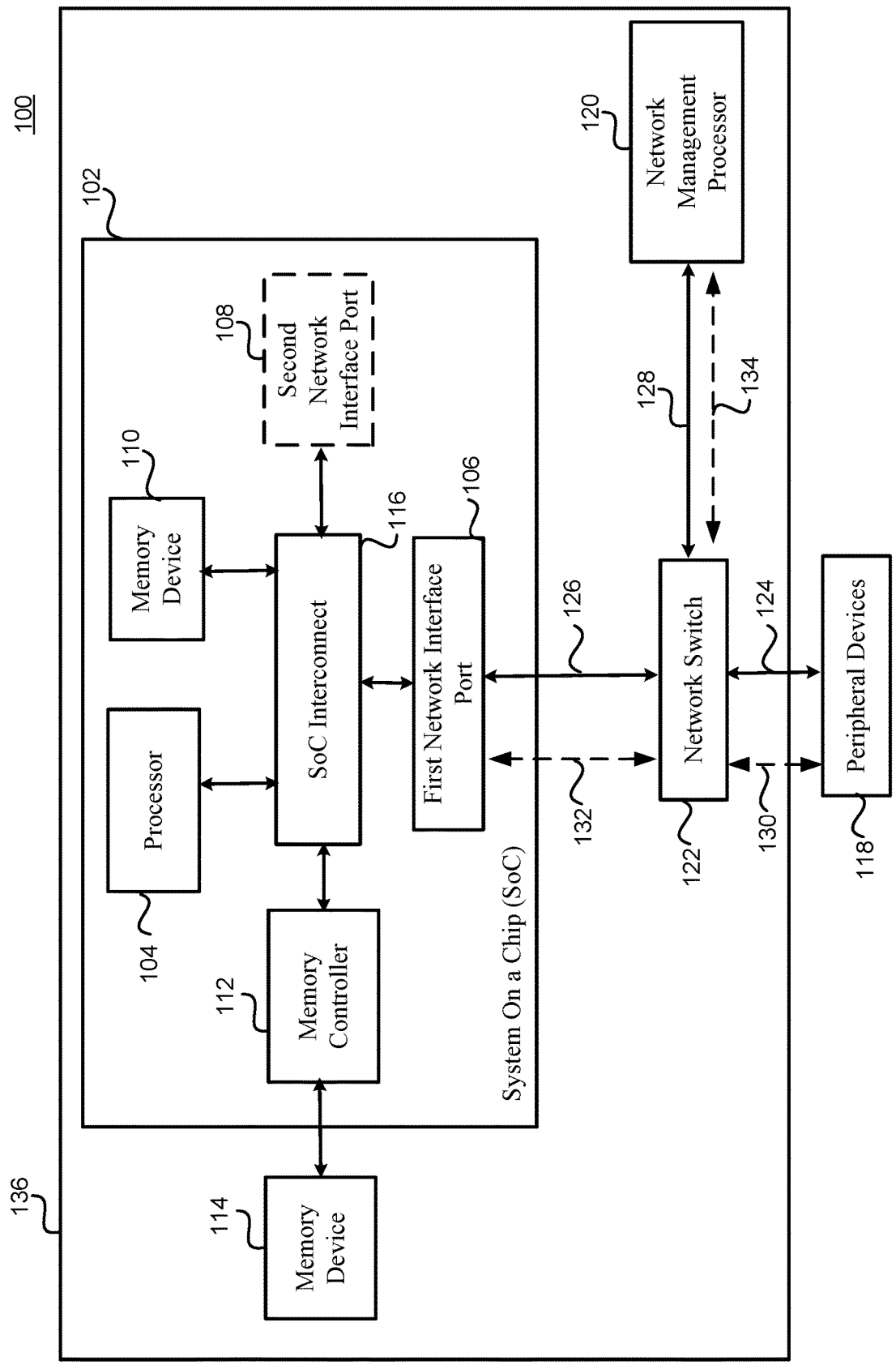
FIG. 1 illustrates a network device with a hardware switch.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Network devices, such as network switches, are becoming increasingly complex in order to meet the demands of modern, high-speed and high-reliability computer networks. As the devices become more complex, they also can become less reliable and more costly. One method of increasing the reliability of a network device is to include failsafe resources within the network device, such as redundant processing logic, bypass paths, etc. However, many network devices maintain some common components even when others are duplicated in order to decrease cost and complexity. One such component can be a network access port that is common between multiple processors. A network device using more than one processor and one common access port can include an independent network switch inside of the device to route information from the network access port to the processors. This switch can add additional cost and complexity to the network device. Hence, a network switch can be implemented within one of the two or more processors, but care must be taken to ensure that the switch functionality remains operational even if the processor faults, else failure of the processor comprising the switch could inhibit traffic flow of the other processors.

In one example implementation, the device may be architected to include a communication network processor and a network management processor. The communication network processor can be used for the routine functionality of the network device. For example, the communication network processor can be used to process and route the majority of network traffic being passed between network devices for most everyday functionality (i.e., watching videos, looking at websites, streaming audio). The network management processor can alternatively be used to service control messages on the network that provide access to low level functionality of the network device via the network management processor. For example, the network management processor could be used to store and report faults, to reset the device, to remotely monitor status of the host system, update software and firmware modules or hardware configurations, etc. In addition, the network management processor may also service network control packets such as packets for route discovery, route reply, etc. Control packets may conform to any suitable protocol, such as Internet Control Message Protocol (ICMP).

Using such a network device architecture, it is desirable to physically separate the functionality of the communication network processor and the network management processor onto separate components of the network device. However, physical separation of these devices generally increases the cost of the network device by adding additional components to the device. Additionally, the network interface between the physical components can influence the cost of the network device. Network devices support ever increasing bandwidth network protocols over time to meet user demands. Network protocols can include Secure Shell, File Transfer Protocol, Transmission Control Protocol, Hyper Text Transfer Protocol, Media Transfer Protocol, Secure Socket Layer, or other protocols. An example network protocol is 10 gigabit per second ethernet (10G). In general, components that support 10G are more costly than components that only need to support a slower data rate. In the architecture conceptualized above, the communication network traffic can require higher bandwidth interconnections than the control network traffic as the control network traffic generally does not transfer large amounts of data, is transmitted less frequently, and likely only services one recipient. As such, the network management processor need not support the costlier, higher bandwidth protocol of the communication network processor.

In certain implementations, the communication network processor and its associated processing may be referred to as the data plane or data plane processing, respectively. Furthermore, the network management processor and its associated processing may be referred to as the control plane or control plane processing, respectively. It should be noted that although the communication network processor and the network management processor are described as using one processor each, several discrete or integrated logical or physical processing entities may be used in implementing the functionality associated with each of these processors. For example, multiple processing entities may be used in implementing the functionality associated with the data plane and the control plane.

Given constraints of the network device having one physical network port, the desire to partition functionality of processing network traffic using two separate ethernet enabled processors, and that the network traffic to each device may use different protocols, one implementation may use a physical network switch within the device to route traffic received by the device to the appropriate processor and using the appropriate protocol for each device. The physical hardware switch can be positioned between the physical network port and the two processors. As used herein, a network switch is a computer networking device that connects devices together on a computer network, by using packet switching to receive, process and forward data to the destination device.

Using a hardware switch for such an implementation disadvantageously requires a relatively high cost physical switch that adds to the cost of the network device. The cost increases come from both the addition of the component to the Bill of Materials (BOM) and the fact that the switch may support the fastest, and therefore highest costing, protocol by one of the processors. The additional component can also lead to the device having reduced reliability because the additional switch component can add to possible failures. The switch can also increase the power consumption of the network device and increase the size of the network device and/or the size of the circuit board that it is mounted upon.

Removing the network switch would therefore be beneficial for reducing the cost of the network device. In order to gain the advantage of removing the device and maintain the functioning of the communication network processor and network management processor, the functionality of the switch can be relocated to another physical device. One such device can be the communication network processor. However, as described above, a purpose of the failsafe architecture described is to isolate the functionality of the communication network processor and the network management processor. By moving the switching functionality to the communication network processor, some of this isolation may be compromised. More specifically, a fault in the communication network processor can impact the functionality of the switch and therefore the routing of control network traffic to the network management processor.

Aspects discussed herein disclose techniques for physically and/or logically isolating the functionality of the network switch from the functionality of processing the communication network traffic while utilizing a common physical processor. This isolation can be aided by partitioning the functionality of the switch from functionality of the communication network traffic. The partitioning can take several forms. For example, the partitioning can be performed on memory, on execution environments, processing resources such as registers, buses, logic or any combination thereof. Partitioning of memory enables isolation from isolating the code and data space of one process from overriding the code and data of the other. Partitioning of the execution environment can prevent one process from accessing another's memory resources, registers, processor cores, etc. Several different techniques can be used to partition the independent functionalities of the switching program and the communication processing as will be discussed herein.

FIG. 1 illustrates an example system 100 using a hardware network switch. The system 100 can include a network device 136 that can include a System on a Chip (SoC) 102 configured to communicate with a peripheral device 118. The SoC 102 can include a processor 104, a first network interface port 106, an optional second network interface port 108, an internal memory device 110, and/or an external memory controller 112. Additionally, an SoC Interconnect fabric can be used to facilitate data transfer between the various elements of the SoC 102. Although only these specific elements are illustrated in the figure, it should be understood that the SoC can include any number of additional or alternative elements. For example, the SoC can include various memory subsystems or memory technologies such as SRAM (Static Random Access Memory), HBM (High Bandwidth Memory), dynamic memory, 3D memory, etc. The term SoC is used generically and can be construed as a processor itself, a CPU (Central Processing Unit), an APU (Advanced Processing Unit), or other processor designation. The SoC can also include a GPU (General Processing Unit), an FPGA (Field Programmable Gate Array), a DSP (Digital Signal Processor), or other logic device(s).

The processor 102 may be a single or multi-core processor. A multi-core processor may include multiple processing units within the same processor. The processor 102 may be configured to execute a plurality of instructions collectively on one or more processors of the processor cores. The instructions may be stored on a computer-readable storage medium, for example, in the form of a computer program. The computer-readable storage medium may be non-volatile. In some implementations, the multi-core processors may share certain resources, such as busses and cache hierarchies (e.g., Level 1 (L1) cache, Level 2 (L2) cache and Level 3 (L3) cache) between multiple-cores. In some instances, each core in a single or multi-core processor may also include multiple executing logical processors (or threads). Some of the non-limiting examples of the multi-core processors may include ARM®'s cortex A57, MIPS, AMID®'s A4, Intel®'s ATOM® etc. The processor can likewise utilize an x86, ARM®, MIPS, or other suitable instruction set.

Memory Devices 110 and 114 can be static or dynamic memory or a combination of the two. The Memory Device 110 is meant to be a non-limiting visual representation of the various memory and memory technologies that can be implemented within an SoC. The Memory Device 110 can be implemented within the same package/die of the SoC. The Memory Controller 112 can also access various memory technologies contained within memory device 114 located off package/die and can utilize various memory interface technologies. For example, the memory controller can be used to access DDR (Double Data Rate) RAM, other types of DRAM (Dyanmic RAM), or SRAM. The controller can utilize SATA (Serial Advanced Technology Attachment), PATA (Parallel Advanced Technology Attachment) or other memory interface protocols/technologies.

The First Network Interface Port 106 and/or the Second Network Interface Port 108 can include a NIC (Network Interface Card/Controller), a serial interface receiver/transmitter (using serial protocols such as SPI (Serial Peripheral Interface), I2C (Inter-Integrated Circuit), CAN (Controller area network), PCIe (Peripheral Component Interconnect Express), USB (Universal Serial Bus), etc.), or a parallel interface receiver/transmitter. When implemented as a NIC, the network interface ports can operate at various speeds (such as 10G, 1G, etc.) and protocols (such as the myriad of 802.1 ethernet protocols). The first 106 and second 108 network interface ports can have their own MAC (Media Access Control) address. The SoC 102 can also have any number of interface ports and of various configurations. For simplicity, only two are illustrated in the figures.

The network management processor 120 can contain elements similar to any of the elements of the SoC 102. In some embodiments, the network management processor 120 and the SoC 102 are identical or almost identical from a hardware standpoint. In other embodiments, the processor 120 and the SoC 102 have different hardware components. The network management processor 120 can generally be differentiated from the SoC 102 by its intended function within a network device (possibly as a result of differences in firmware or software on the processor 120 and the SoC 102). The network switch 122 can use any interface technology compatible with network interface port(s) of the SoC and the network management processor 120. Interface links 124, 126, and 128 are illustrated to show the physical paths available to transfer data between the peripheral device 118, SoC 102, and the network management processor 120. The SoC 102 and network management processor 120 can be physically located within the same network device 136 and/or can be physically mounted to the same substrate or circuit card. In certain embodiments, the network management processor 120 can be a Baseboard Management Controller (BMC).

FIG. 1 additionally illustrates paths of network traffic that can be used to improve the reliability and serviceability of the network device 136. As stated previously, the SoC 102 can be implemented as a communication network processor in order to process or direct communication network data packages that are transferred between the network device 136 and the rest of a computer network (illustrated here as peripheral devices 118). As stated previously, the communication network traffic can be of higher volume, require higher bandwidth, and may require lower latency as compared to the control network traffic. The control network traffic 134 may require less bandwidth and a have a relaxed latency requirement, but may be assigned a higher priority for routing/processing to ensure that low level access can be maintained to the device 202 regardless of the functionality of the SoC 102. Concurrently, the network management processor can be configured to allow access to the network device 136 even when the SoC 102 is no longer operational. The control network traffic 134 can be used to access the network management processor 120 to enable functionality of the network device 136 and/or perform additional functionality that may not be available to the SoC 102. For example, the network management processor 120 may have the ability to reset the SoC 102 or other components of the network device 136. The network management processor 120 can have specialized data logging functionality to enable error detection, correction, and/or reporting regarding the network device or other devices of the network. Alternatively, the network management processor 120 may be a redundant copy of the functionality of the SoC 102 to allow the device 136 to switch functionality between the two devices when one fails.

FIG. 1 illustrates network traffic 130 transferred between the peripheral devices 118 and the network device 136. The network traffic 130 can contain communication network traffic and control network traffic, or either individually. The network switch 122 can route the network traffic to the appropriate component (SoC 102 or network management processor 120). For example, communication network traffic 132 can be directed solely to the SoC 102. Control network traffic 134 can solely be routed to the network management processor 120. The interface links 124, 126, and/or 128 can be disparate technologies such as serial interfaces, parallel interfaces, copper interfaces, wireless interfaces, etc. Additionally, disparate protocols can be used among the different interface links. For example, control traffic 134 can be transferred using a SPI protocol, whereas communication traffic 132 can be transferred using ethernet. Alternatively, control traffic 134 can be transferred using a 1G ethernet protocol whereas communication traffic 132 can be transferred using a 10G ethernet protocol.

The architecture of FIG. 1 allows the network management processor 120 to operate relatively independently of the SoC 102. Network traffic can flow between peripheral devices 118 and the network management processor 120 without interaction with the SoC 102. Conversely network traffic can flow between peripheral devices 118 and the SoC 102 without interaction with the network management processor 120. This isolation between the two devices can allow the network management processor 120 to function even if the SoC 102 has faulted. The independent functionality of the network management processor 120 aids in providing more robust access to lower level functionality. This low level functionality can be useful for determining diagnosing, and/or remedying fault conditions (such as fault of the SoC 102).

Given the above architecture, the SoC 102 provides the main functionality of the device 136. The network management processor 120 provides secondary functionality. As such, the network traffic between the SoC 102 and the peripheral devices 118 may require more bandwidth than the network traffic between the peripheral devices 118 and the network management processor 120. However, the network switch 122 must be able to accommodate all network traffic at the highest network connection protocol and speed because the same network switch 122 services both the SoC 102 and the network management processor 120. As such, the network switch 122 can add significant cost to the network device 136. Additionally, the network switch can 122 require additional physical space within the device and require additional power to operate.

Figure 2:
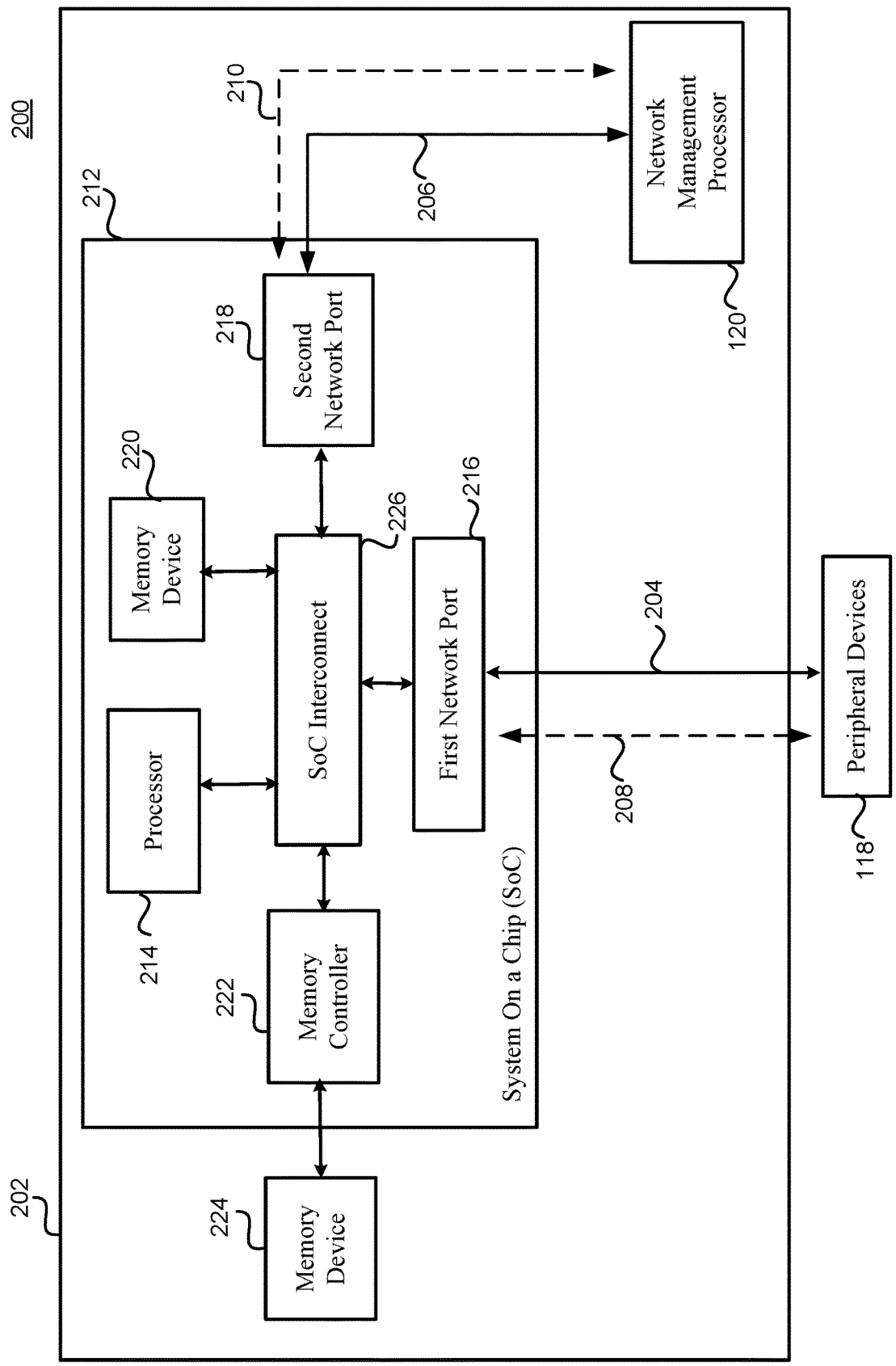
FIG. 2 illustrates a network device with an integrated switch.

FIG. 2 is a block diagram illustrating exemplary aspects of the disclosure. The network management processor 120 functionality may remain consistent between the hardware implemented system 100 of FIG. 1 and the system 200 of FIG. 2, or it may be somewhat different. The functionality and/or structure of the SoC 212, however, is enhanced in the system 200 of FIG. 2 to implement an integrated switch. The components (SoC 212, memory device 224, network management processor 120) may have similarities between the system discussed in FIG. 1 and FIG. 2. The SoC 212 can include a processor 214, a first network interface port 216, a second network interface port 218, an internal memory device 220, and/or an external memory controller 222. Additionally, an SoC Interconnect fabric can be used to facilitate data transfer between the various elements of the SoC 212. Although only these specific elements are illustrated in the figure, it should be understood that the SoC can include any number of additional or alternative elements. For example, the SoC can include various memory subsystems or memory technologies such as SRAM (Static Random Access Memory), HBM (High Bandwidth Memory), dynamic memory, 3D memory, etc. The term SoC is used generically and can be construed as a processor itself, a CPU (Central Processing Unit), an APU (Advanced Processing Unit), or other processor designation. The SoC can also include a GPU (General Processing Unit), an FPGA (Field Programmable Gate Array), a DSP (Digital Signal Processor), or other logic device(s).

The processor 212 may be a single or multi-core processor. A multi-core processor may include multiple processing units within the same processor. The processor 212 may be configured to execute a plurality of instructions collectively on one or more processors of the processor cores. The instructions may be stored on a computer-readable storage medium, for example, in the form of a computer program. The computer-readable storage medium may be non-volatile. In some implementations, the multi-core processors may share certain resources, such as busses and cache hierarchies (e.g., Level 1 (L1) cache, Level 2 (L2) cache and Level 3 (L3) cache) between multiple-cores. In some instances, each core in a single or multi-core processor may also include multiple executing logical processors (or threads). Some of the non-limiting examples of the multi-core processors may include ARM®'s cortex A57, MIPS, AMD®'s A4, Intel®'s ATOM® etc. The processor can likewise utilize an x86, ARM®, MIPS, or other suitable instruction set.

Memory Devices 220 and 224 can be static or dynamic memory or a combination of the two. The Memory Device 220 is meant to be a non-limiting visual representation of the various memory and memory technologies that can be implemented within an SoC. The Memory Device 220 can be implemented within the same package/die of the SoC. The Memory Controller 222 can also access various memory technologies contained within memory device 224 located off package/die and can utilize various memory interface technologies. For example, the memory controller can be used to access DDR (Double Data Rate) RAM, other types of DRAM (Dynamic RAM), or SRAM. The controller can utilize SATA (Serial Advanced Technology Attachment), PATA (Parallel Advanced Technology Attachment) or other memory interface protocols/technologies.

The First Network Interface Port 216 and/or the Second Network Interface Port 218 can include a NIC (Network Interface Card/Controller), a serial interface receiver/transmitter (using serial protocols such as SPI (Serial Peripheral Interface), I2C (Inter-Integrated Circuit), CAN (Controller area network), PCIe (Peripheral Component Interconnect Express), USB (Universal Serial Bus), etc.), or a parallel interface receiver/transmitter. When implemented as a NIC, the network interface ports can operate at various speeds (such as 10G, 1G, etc.) and protocols (such as the myriad of 802.1 ethernet protocols). The first 216 and second 218 network interface ports can have their own MAC (Media Access Control) address. The SoC 212 can also have any number of interface ports and of various configurations. For simplicity, only two are illustrated in the figures.

The system 200 of FIG. 2 lacks the hardware network switch 122 of the system 100 of FIG. 1 and instead implements switching functionality using the SoC 212. In the system 200 of FIG. 2, network traffic 208 can be transferred directly between the peripheral devices 118 and the SoC 212 via the interface link 204. The network traffic 208 can contain both communication network traffic and control network traffic 210. Using the second network interface port 218 of the SoC 212, the control network traffic 210 can then be forwarded from the SoC 212 to the network management processor 120 via interface link 206. Interface link 206 can be considered a sideband network interface link between the SoC 212 and the network management processor 120.

The implementation shown in FIG. 2 removes the hardware network switch 122 of the FIG. 1 network device 136 from the bill of materials of the network device 202. The removal of the switch 122 can reduce the cost, decrease the size, and/or increase the reliability of the network device 202. However, one having skill in the art would appreciate the tradeoffs that must be realized by this approach. For instance, the purpose of the architecture, as previously indicated, is to maintain access to the low level functionality of the network management processor 120 for instances such as when the SoC 212 has failed. Moving functionality from the network switch 122 to the SoC 212 may reduce the independence between the SoC 212 and the network management processor 120. In other words, care should be taken to help ensure that the control network traffic functionality is operational even when the functionality of the SoC 212 for routing of the communication network data has ceased to function.

Several aspects will now be discussed that enable the SoC 212 to route control network traffic and communication network traffic independently and enable the SoC 212 to route control network traffic 210 to the network management processor 120 regardless of the functionality of the routing of the communication network traffic by the SoC 212.

One aspect to improve the independence of the functionalities of the two processors pertains to the partitioning of the control network traffic switching functionality from the communication network traffic processing functionality. Partitioning can be performed on the computer instructions that direct the device to perform each function. As stated earlier, the primary purpose of the network device 202 may be to process communication network traffic. In that instance, many of the network device's resources may be tailored to and allocated for the primary purpose. As such, the SoC 212 can be tailored to provide resources available to perform a given primary function (such as the processing communication network traffic) with few remaining resources. This tailoring can be done in hardware or software. In general, excess resources lead to a more costly product that is "over engineered" for the intended purpose and therefore an SoC may have few excess resources available for implementing switching functionality, for example. Therefore, the memory device 224 of the network device 202, the processor 214, or other elements may be selected to fulfill the primary purpose with little excess functionality.

One such implementation of an SoC 212 to enable the network device 202 to act as a high speed network switch, for example, can use a kernel of an Operating System (OS). A kernel, as used herein, is a program that manages I/O (input/output) requests from software, and translates them into data processing instructions for the processor and other electronic components of an SoC. For example, Linux is an OS that may be suitable for such an operation. The use of the OS and the OS kernel can reduce product and software development times and costs by abstracting certain functionalities of an SoC and automating basic functions of the software as well (such as scheduling). However, the use of an OS or other software, especially when functionality is abstracted, can lead to unforeseen consequences that can manifest as faults within the system. These faults can prevent the main functionality of the network device or even the SoC itself. If, for example, the OS or the software used to implement the primary function of the network device were stuck in an infinite loop, the processor may become inaccessible by other programs or functions.

Issues such as these can dissuade the use of a single SoC to perform functions that need isolation and independence from each other (such as routing communication network traffic and control network traffic independently) because a fault in the communication routing functionality can impact the ability of the SoC to route control network traffic. Another error case can manifest itself when the same area of memory or an SoC register is accessed by the two independent software programs implementing the independent functionalities. This can lead to data corruption and/or data security breaches between the two and can, in itself, cause a fault in the functionality of the device.

As stated previously, several methods can be used to partition the functionality of the switching functionality from the processing of the communication network traffic. One such method is to isolate the functionalities in two different executing environments. An execution environment is a term used commonly in virtualized machines wherein each virtual machine operates in the same computing device without knowledge of or interaction with each other. This isolation can be orchestrated by a virtual machine manager. The virtual machine manager can create virtualized address spaces for each execution environment that each reference different physical memory addresses. In other words, the physical memory is abstracted such that each execution environment has its own virtual memory address space that maps to physical memory locations. In this manner, the two execution environments can have identical virtual memory addresses that map to separate physical memory locations, as will be discussed herein.

The virtual machine manager can also "virtualize" the functionality of any processing core or resources. For example, a serial processor can be time sliced to process instructions from each execution environment at different times. Although this method may result in delays, it can improve the isolation between the execution environments by preventing one execution environment from having exclusive control over the processor.

Hardware partitioning can also be used in addition to, alternatively, or to supplement the execution environment isolation. An example of hardware partitioning is to physically separate the memory address spaces between the two functions. For example, one can have a certain block of static memory addresses assigned and a certain block of dynamic memory addresses assigned. However, this approach may require that the two functions be written specifically so that they can coexist within the same device. Another hardware function that can aid in isolating functionality is the use of hardware context switching. At a high level, context switching allows a processor to save its current state for future retrieval. For example, if the same processor were allocated to two separate processes, it can suspend processing of a first process to context switch to the other. Later, the processor can continue processing the first process by retrieving its previous state. Context switching can include a mechanism for saving registers, caches, etc. for later retrieval.

Processor interrupts can also be used in order to alter the priority of processor tasks. An interrupt is a signal to the processor indicating that an event needs immediate attention. Interrupts can be implemented in hardware or software. Interrupts can be used to divert a processor's resources to service another task. Many processors have multiple interrupts of varying priorities. A processor can have interrupts associated with security or other tasks than can be used to preempt the processing of other instructions or even other interrupts. Interrupts can therefore be used to prioritize functionality between different processes or device operational modes. For example, the functionality of routing the control network traffic can be associated with interrupts that take priority over the routing of the communication network traffic. In this manner, there can be a higher degree of certainty that the control network traffic will be routed regardless of the functionality of the communication network traffic.

Certain interrupts can be assigned to an execution environment. In this manner, different execution environments can be triggered via separate interrupts. As the interrupts can be assigned different priorities, the partitioned execution environments can also have different priorities. For the example architecture, the control network traffic can be processed by an execution environment with higher priority than the communication network traffic. Such a schema can improve the likelihood that control network traffic is processed if the two types of traffic are processed by the same physical processor. Alternatively, two or more separate and independent processors can be used, one assigned to each partition/execution environment.

The previously stated mechanism to partition functionalities can be implemented in software, hardware, or a combination of the two. Some processors can include functionality to aid in this partitioning. For example, ARM® Holdings, plc of Cambridge, England licenses several security technologies under the TrustZone® moniker. These technologies were developed and are marketed to enhance system security using ARM Licensed® designs. Some of the technologies implemented via TrustZone® are designed to implement separate execution environments, some of which can be "secure" while others can be non-secure. TrustZone® technologies can include a Memory Management Unit (MMU) to virtualize system memory, context switching within one or more ARM® processors, and interrupt prioritization to switch between execution environments.

TrustZone® technologies can be repurposed to implement the provisioning functionalities described herein. For example, the switching program and the communication network traffic processing can be implemented via separate execution environments of a TrustZone® enabled device. This switching functionality can be assigned to a secure execution environment that is isolated from a non-secure communication network traffic processor. In this manner, both functions can be performed independently and need not be tailored to work on the same device, i.e. the functionality is more portable and verification becomes less costly. Assigning the switching functionality to the secure partition can aid to ensure that switching functionality remains operational regardless of the status of the communication network traffic processing. For example, a secure (high priority) interrupt can be assigned to signal the processor to process the switching whenever control network traffic has been received.

Alternatively, the switching functionality can be assigned to an execution environment that is not isolated from the communication network traffic processing while the functionality of the communication network traffic processing can be isolated from switching functionality. In other words, the execution environment of the switching functionality can have control and/or insight into the execution environment of the communication network traffic processing, but not vice-versa. In this manner, the switching functionality can have greater control over the network device. For example, if the functionality of the communication network traffic processing attempts to access a port or buffer that the switching functionality needs access to, the switching functionality can redirect or otherwise account for the communication network traffic processing functionality. In this manner, the switching functionality can act as a higher privileged host process/execution environment that the communication network traffic processing functionality is subservient to.

Figure 3:
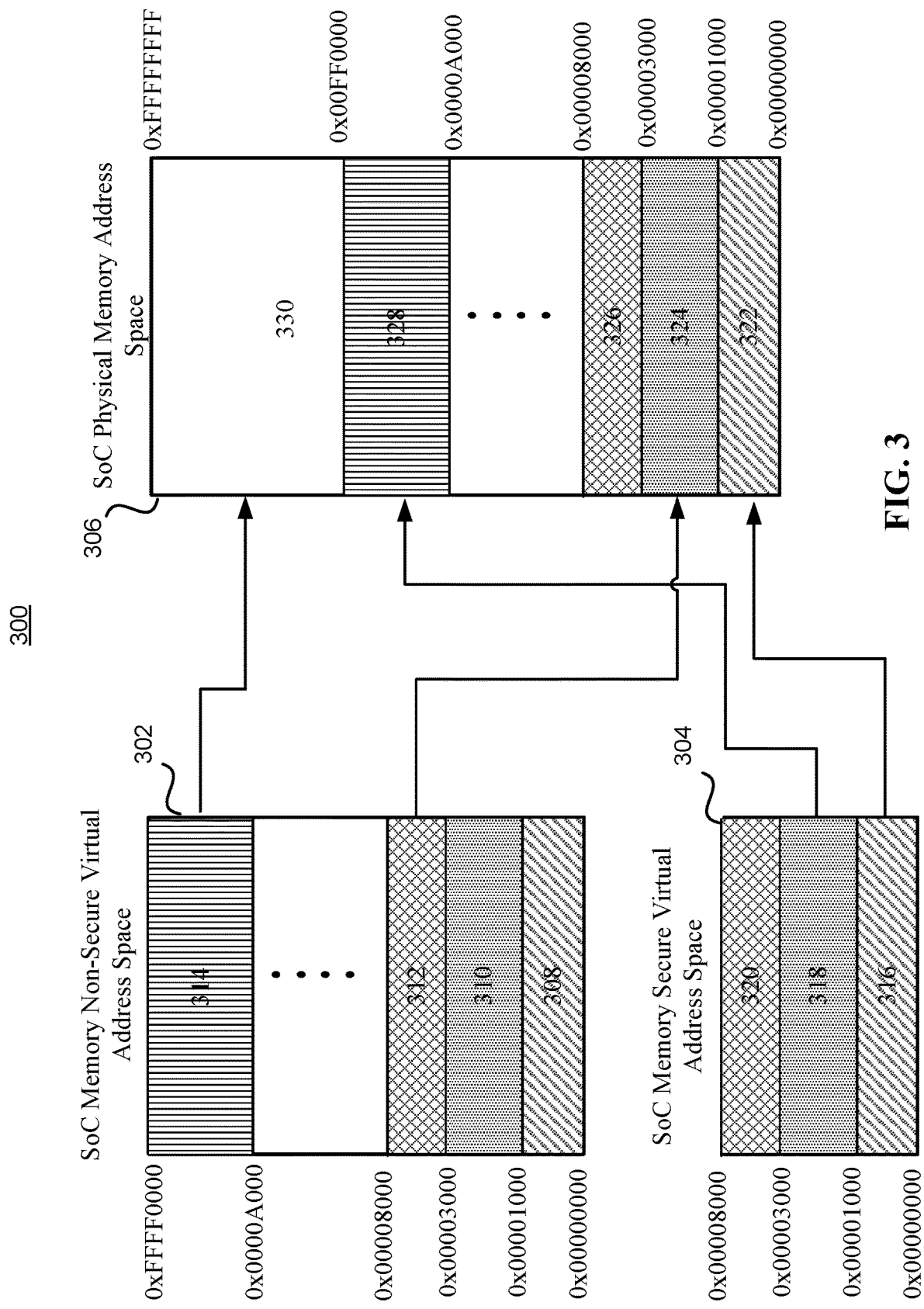
FIG. 3 illustrates an embodiment of a memory map of a network device.

FIG. 3 illustrates several memory maps 300 to visualize the virtual partitioning of memory described earlier. A notional memory map 302 is illustrated as a virtual non-secure virtual address space. Memory map 304 is a notional secure virtual memory mapped space. Memory map 306 is the physical memory space available on a device, such as an SoC. The memory map 306 is meant to be a non-limiting representation of various physical memory addresses and can refer to static memory, dynamic memory, different memory chips, different memory technologies, and/or memory that can be within the SoC or on a separate chip. In addition, the physical memory address space may be split between several memory components, internal or external to the SoC or any combination thereof. For example, memory address area 322 can refer to static memory located within the SoC (such as 110). Memory address area 324 can refer to primary memory/RAM located in a different memory device (such as 114). As an example, the communication network processing function can be assigned virtual memory space 302 (such as by the MMU). The switching functionality can be assigned virtual memory address space 304. Each of these virtual spaces have memory addresses that can be segregated 308-320. Each of these memory segregated areas can correspond to static memory, dynamic memory, or other. Each of these memory segregated areas can be mapped to a physical memory address space. For example, virtual memory addresses 314 are mapped to physical memory addresses 330 and virtual memory addresses 318 are mapped to physical memory addresses 328. Note that each virtual memory address space can contain identical memory addresses that are each mapped to different physical memory addresses. In this manner, two execution environments can be processed on the same device concurrently and independently without corrupting each other.

As stated, some memory areas can be static memory located on an SoC. Generally, static memory located on the die of an integrated circuit, such as an SoC, is relatively limited in size. This is because the static memory uses a relatively large amount of space on the die and can be expensive. However, the static memory can be useful for storing the switching functionality of the system 200 of FIG. 2. The static memory advantageously can be more secure than other memories located, for example, off of the die. This is because the on-die static memory can be more difficult to access from outside of the SoC and can be less susceptible to perturbations that can cause faults, such as bit flip. As such, the on-die static memory can be used to implement the switch functionality. Additionally, this memory (or a portion of this memory) can be accessed via a switching execution environment and/or via a security interrupt to implement the switch functionality. For example, the TrustZone® technologies described herein can be used in conjunction with this on-die memory. However, the limited space of the on-die memory limits the functionality that can be implemented using such memory.

Figure 4:
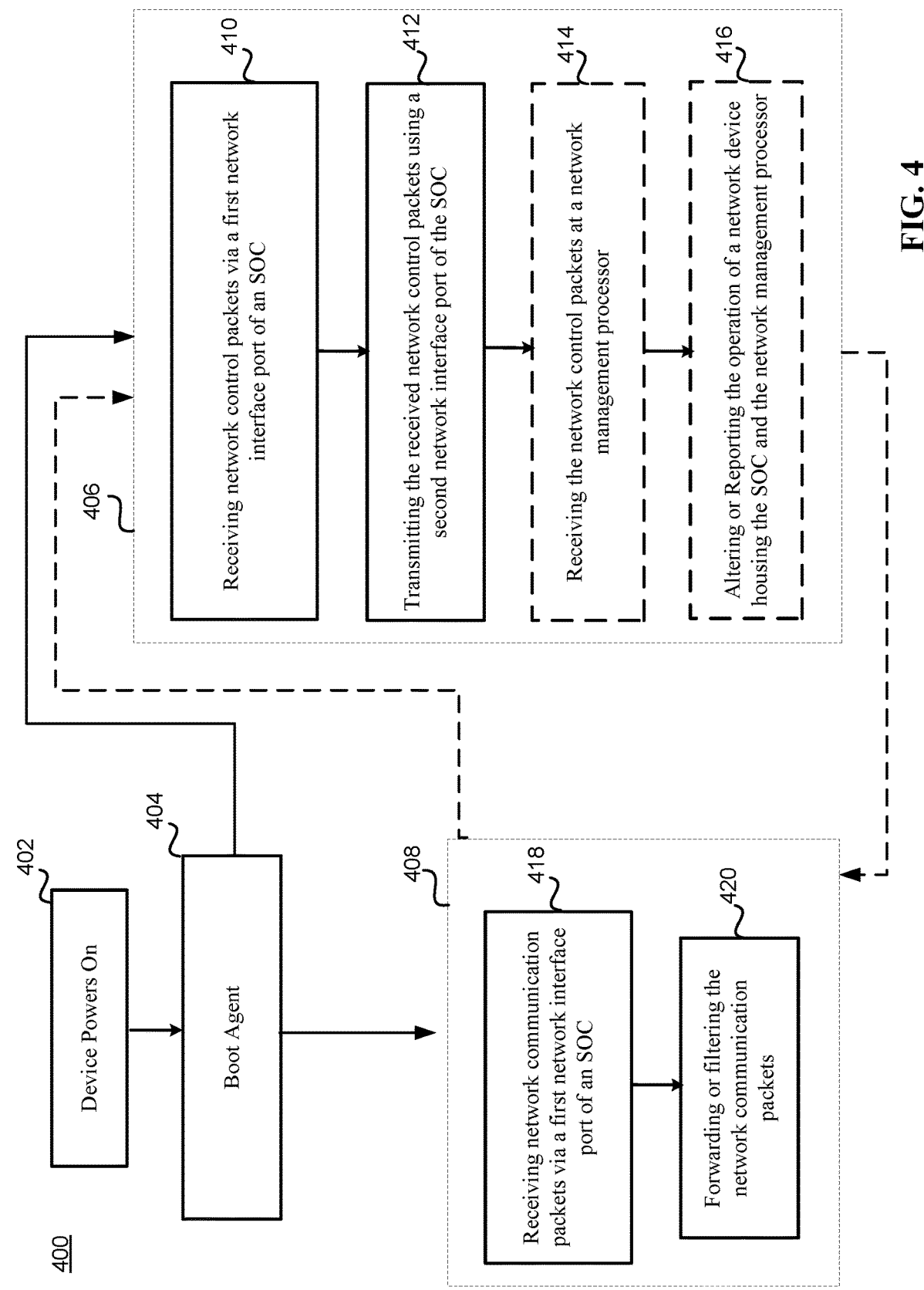
FIG. 4 illustrates a flow diagram of the functionality of the network device of FIG. 2.

FIG. 4 illustrates a flow chart of an exemplary embodiment of the operation of the SoC 212 when integrated into the system 200 of FIG. 2. Some or all of the processes described herein, or variations, and/or combinations thereof may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At step 402, the device is powered on and the SoC 212 begins to operate. After this step, a boot agent 404 can run, optionally from internal memory of the SoC 212. The boot agent 404 can perform several tasks related to initiating execution environments (such as populating interrupt tables and/or populating page tables for virtualization techniques) and can initiate instructions to populate the execution environments. As examples, instruction environment 406 includes functionality for a switching program while execution environment 408 includes functionality of communication network traffic processing. In this manner, two distinct processes can begin to operate on the SoC 212, even though the processes may share SoC 212 resources, such as a processor 214. Using the technologies and methods discussed herein, the switching execution environment 406 and the communication execution environment 408 can be isolated even though they can run on the same component. For example, the switching execution environment 406 can implement the switching functionality previously described and can be located on static memory of the SoC. The two processes can run on independent execution environments using the virtualization technique described. This isolation can allow the two processes to continue running regardless of the status of the other. Additionally, the switching execution environment 406 can be prioritized such that its functionality will be processed at a higher privilege than the functionality of the communication execution environment 408 (such as by assigning the switching execution environment 406 to an interrupt higher than an interrupt of the communication execution environment 408). Alternatively or additionally, the two processes can operate independently on the same device without the use of virtualization. For this implementation, resources needed for each process can be separated. In a further embodiment, the switching execution environment 406 can insight into the communication execution environment 408 in order to regulate and/or safeguard the functionality of the switching functionality over the functionality of the communication execution environment 408. These embodiments are illustrated in FIG. 4 by indicating that the communication execution environment 408 can be interrupted by the switching execution environment 406. For example, the processes of the switching execution environment 406 can be assigned a high priority interrupt to be more privileged than interrupts and processes of the communication execution environment 408.

The instructions of either or both of the switching execution environment 406 and the communication execution environment 408 can constitute an independent software stack. As a software stack, each of the execution environments can operate on a hardware device without additional software or instructions. In other words, the switching execution environment 406 software stack can run on an electronic device without the communication execution environment 408 software stack being present on the device and vice-versa. Furthermore, as disclosed herein, the switching execution environment 406 software stack can be assigned a higher privilege and may therefore have insight into and/or priority over the communication execution environment 408 software stack.

The switching execution environment 406 can operate by first receiving network control packets via first network interface port 216 of a network device 202. As stated earlier, the first network interface port can be an ethernet port and can operate at relatively high speed to facilitate the operation of the network device for processing communication network traffic. The control network traffic and the communication network traffic can be received via the same network interface port and therefore may need to operate at the same speed (10G, for example).

At step 410, the network device can be configured to receive network control packets via a first network interface port 216 of an SoC 212. At step 412, the network device can 202 be configured to transmit the received network control packets using a second network interface port 218. At optional step 414, the network management processor can receive the control packets. The second network interface port 218 can operate at a lower speed or even use a different protocol from the first network interface port 216. If, for example, one were replacing the system of FIG. 1 with the system of FIG. 2 while using comparable network management processors 120, it may be beneficial to match the speed or protocol of the second network interface port 218 with the prior protocol/speed used between the network management processor 120 and the network switch 122. For example, if the interface link 128 in FIG. 1 operated via a 1G ethernet connection, it would be beneficial for the second network interface port 218 to operate on a 1G ethernet protocol as well so that the same network management processor 120 can be used between the two devices.

At optional step 416 of the switching execution environment 406, the operation of the network device 202 can be altered by the network management processor 120, or information regarding the operation of the network device can be transmitted by the network management processor 120. During this step, the control network traffic can be used alter the operation of the network device, such as to reset all or portions of the device, force the value of data contained in a memory location, manually operate a component of the device, change operating parameters of the device, etc. Information regarding the operation of the device can also be relayed back to the network such as any current failures of the device, fault logs, operating parameters of the device (such as temperature), various device history files, etc.

Referring now to the communication execution environment 408, at step 418 the network device can be instructed to receive network communication packets via the first network interface port 216 of the device 202. Note that this network interface port can be the same port as the one used to receive data for the switching execution environment 406 during step 410. At step 420 of the process, the network packets can be forwarded via another port or the same port of the device. This simplified process 408 only addresses limited functionality that could be performed by the communication execution environment 408. It should be understood from this disclosure, that the communication execution environment 408 can encompass many different network related processes of varying complexities. For example, the communication execution environment 408 can be a network switching process for routing ethernet packets, a data streaming server (for audio, video, etc.), a translator for interfacing disparate networks, a virtual machine, etc. It should also be noted that multiple processes can be uses alongside the switching execution environment 406, of varying types or complexities.

Figure 5:
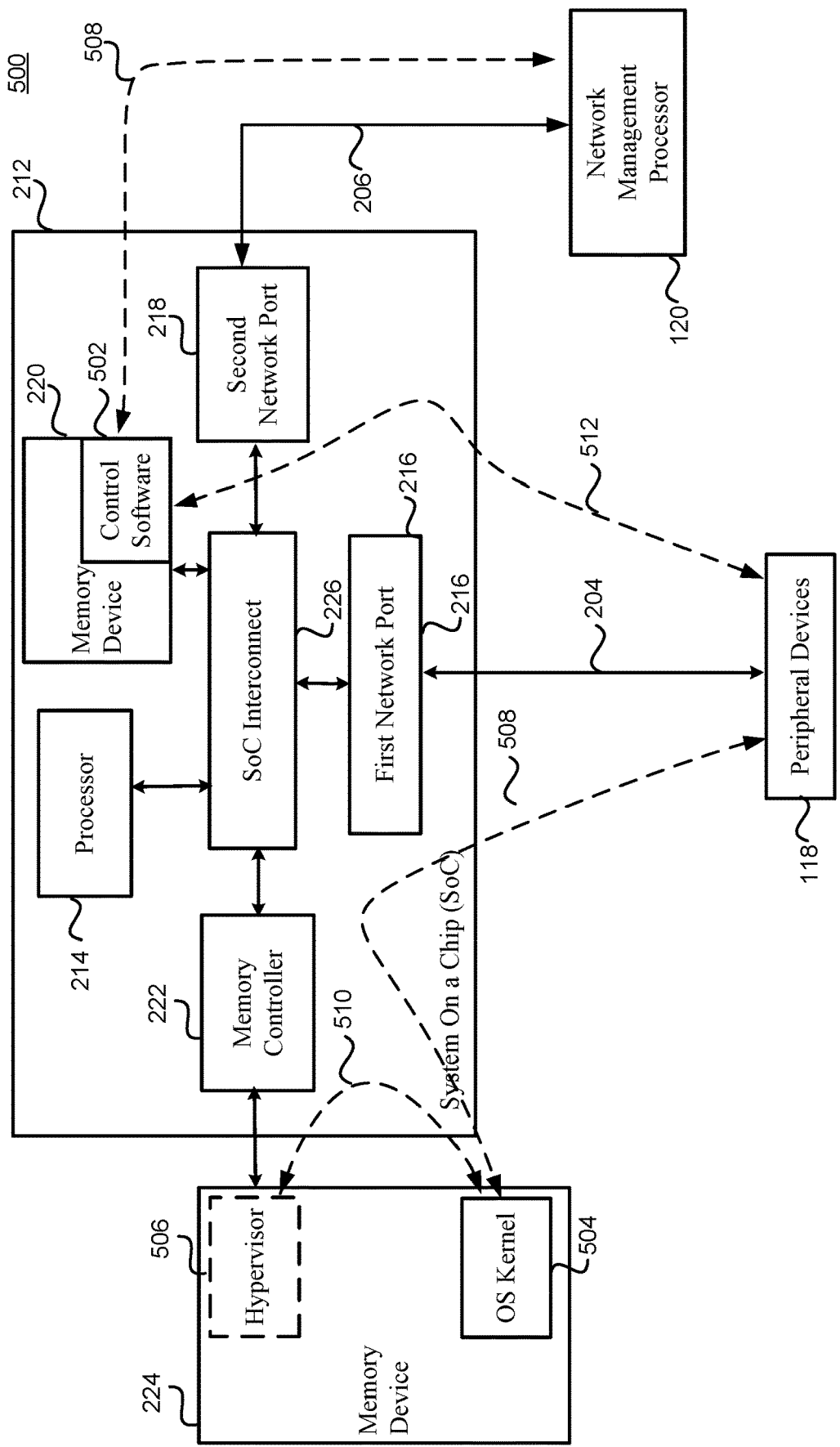
FIG. 5 illustrates a functional diagram of the device of FIG. 2.

FIG. 5 illustrates the system 200 of FIG. 2 with dashed arrows for indicating the data paths and additional software components, according to certain aspects of the disclosure. The system 500 of FIG. 5 includes control software 502 that is illustrated as being located within memory device 220 of the SoC 212. The memory device 220 can be SRAM and can further be a secure area of the onboard SRAM of the SoC 212. The figure includes data paths 512 and 508 that illustrate that control network traffic data can be transferred between the peripheral devices 118, the SoC 212, and the network management processor 120. Also illustrated are data paths 508 which illustrate that communication data can be transferred between the peripheral device and an OS Kernel 504 located in memory device 114. The OS kernel 504 can be used to implement the communication mode/functionality of the SoC 212.

FIG. 5 also includes an optional hypervisor 506 that can be located within the memory device 224 or elsewhere. The hypervisor 506 can be used to prevent the Kernel 504 from interfering with the operation of the processor 214 when the processor 214 is implementing the functionality of both the control software 502 and the kernel 504. A boot process agent can be used to load the hypervisor 506 and the control software 502 to the appropriate memory locations during startup and configure the system appropriately. The boot process agent can reside in SRAM on the SoC 212 and can be used to setup a virtualized environment and/or load the hypervisor 506 and/or control software 502 into appropriate memory locations. The agent can be used to override itself with other functionality, such as the control software 502 or the hypervisor 506. The hypervisor 506 can use virtualization techniques to redirect data access requests from the kernel 504. Since the control software 502 and the kernel 504 can utilize the same processor 214 and can utilize the same memory space, collisions may occur when both try to access the same memory location or system register. The hypervisor's 506 redirection of the kernel 504 can be used to redirect the kernel 504 in a seamless way so that the kernel 504 or other software need not be coded specifically to account for the existence of the control software 502. In this manner, the same kernel 504 and control software can be used with the system 100 of FIG. 1 or the system 200 of FIG. 2. Data path 510 illustrates the transfer of data between the kernel 504 and the hypervisor 506.

As stated herein, TrustZone® technology can be used to isolate functionalities between secure execution environments and non-secure execution environments. TrustZone® functionality can require specific hardware functions to maintain this functionality between disparate devices and components. In general, ARM® supplied/licensed components can maintain this functionality, ARM® components can be mixed with other components that do not provide TrustZone® functionality. Additionally, a singular SoC can be created using ARM® licensed Intellectual Property (IP) blocks and non-ARM® IP blocks. Therefore, certain portions of an SoC can be TrustZone® non-compliant while other portions are compliant. This disparity of features sets can be at least partially circumvented using the hypervisor 506 program described herein to implement virtualization technology to create different execution environments. Additionally, the hypervisor 506 functionality can be used in conjunction with TrustZone® functionality. For example, the hypervisor 506 can be used to implement address translation while interrupts can be used with TrustZone® technology. In this manner, memory can be used that is not under the purview of the MMU.

Figure 6:
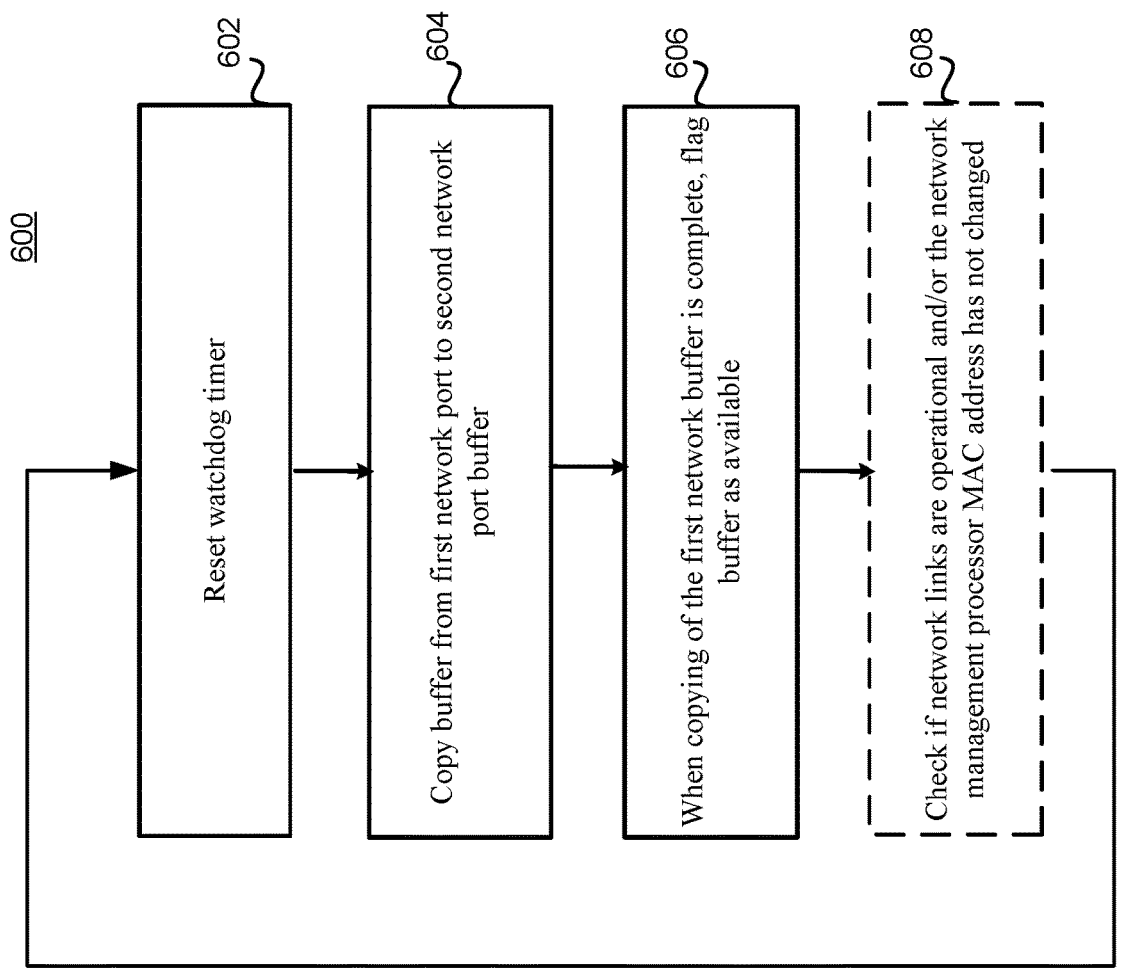
FIG. 6 illustrates a notional functional block diagram of the functionality of a control program used with the device of FIG. 2.

FIG. 6 illustrates an exemplary embodiment of a process 600 for the operation of the control software 502 illustrated in FIG. 5. At step 602 of the process, a watchdog timer is reset. Since the process 600 is shown running in a continuous loop, a watchdog timer can be used to force a reset of the process 600, the processor 104, or some portion of the SoC 212. Watchdog timers can be implemented via hardware or software. The watchdog can include a timer that, when not reset at predetermined intervals, causes the reset.

At step 604, the buffer of network data from the first network port is copied to the second network port. As stated previously, the two network ports can operate with different protocols or speeds. These may be controlled in hardware or via software. Copying the buffers represents the movement of data between the ports. At step 606, the buffer is flagged as available. This step can signal to another program or to hardware elements of the SoC 212 that the receiving buffer is available because the data contained within has already been copied. New data can therefore be copied into the buffer. At optional step 608, the control software 502 can check to ensure that the network management processor 120 has not been removed, replaced, or faulted. In response to this step, the control software 502 can signal to the network that there is a fault, it can suspend the operation of the data forwarding, or perform other functions. It should be noted that the functionality of the control software 502 may be limited by the amount of memory space available on board the SoC 212.

Figure 7:
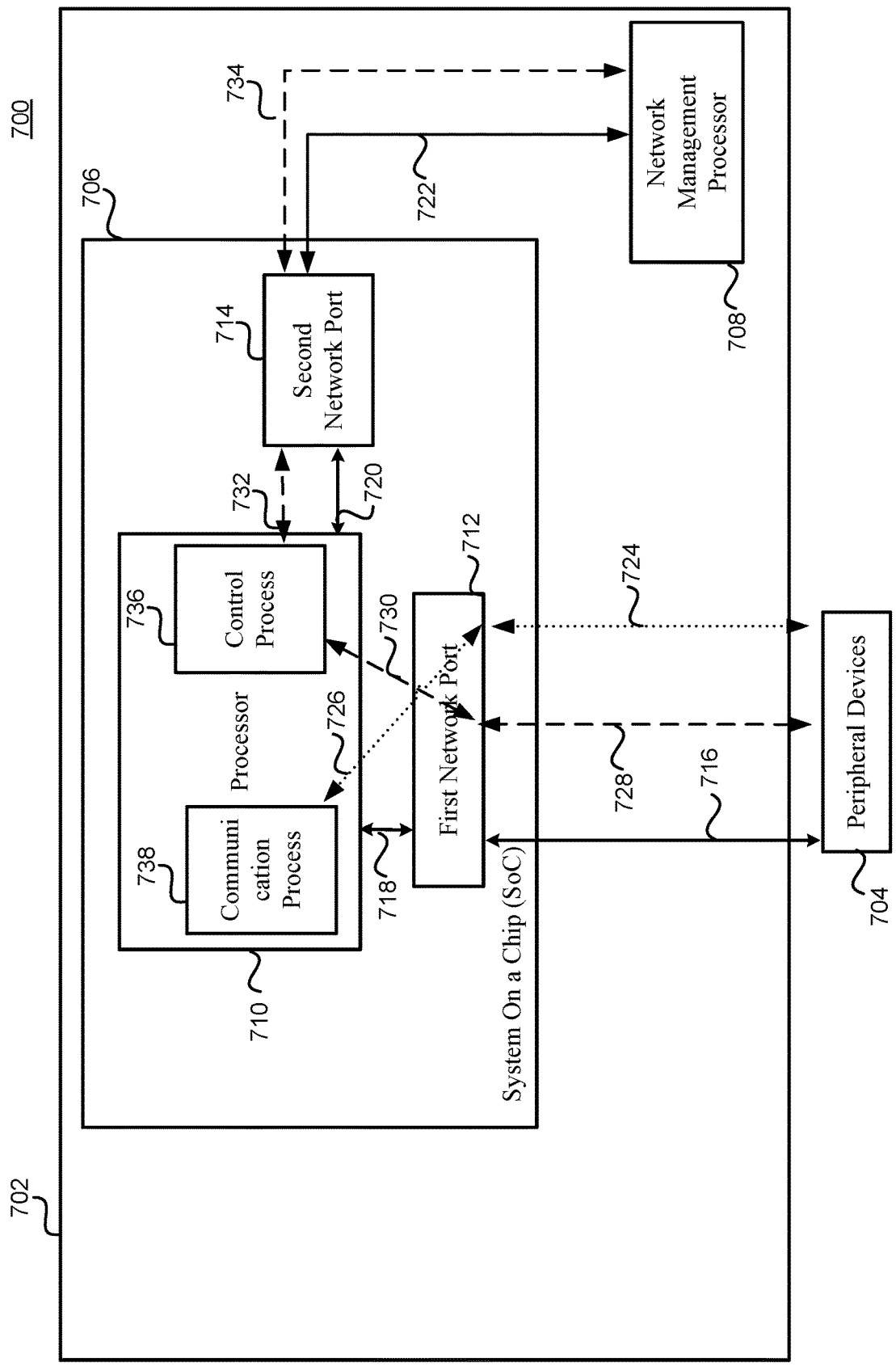
FIG. 7 illustrates a notional logical diagram of one embodiment of the present disclosure.

FIG. 7 illustrates a functional diagram to further illustrate aspects of the disclosure. The system 700 illustrated contains a network device 702 in communication with peripheral devices 704. The network device 702 includes an SoC 706 and a network management processor 708. The SoC 706 includes a processor 710, a first network port 712, and a second network port 714. The processor 710 includes blocks 736 and 738 that represent the functionality of a control process and a communication process, respectively. This logical illustration shows that the processor 710 can be partitioned to run the two processes 736 and 738 concurrently and isolated from each other using the methods described herein (such as using partitioning techniques that may be implemented using TrustZone® technologies). Items 716, 718, 720, and 722 can indicate physical data paths between the components of the diagram such as copper traces or can represent protocols used between components (such as ethernet, SPI, USB, etc.). Alternatively, the data paths can be implemented using wireless or radio protocols such as Bluetooth®, Near Field Communication (NFC) or others. Items 728, 730, 732, and 734 denote control network traffic. The control network traffic can be the previously disclosed control network traffic used in the systems 100 and 200 of FIGS. 1 and 2 respectively to facilitate the functionality of the network management processor 120. Items 724 and 726 denote communication network traffic. The communication network traffic can be the previously disclosed communication network traffic used in the systems 100 and 200 of FIGS. 1 and 2 respectively to facilitate communication network traffic processing. As illustrated, the control process 736 can implement switching functionality of the SoC 706 to receive control network traffic 728 by the SoC 706 and route the control network traffic 734 to the network management processor 708. Additionally, the SoC 706 can independently provide the functionality of the communication process 738 to process the communication network traffic 728 received by the SoC 706. The First Network Port 712 can be used to route traffic to the appropriate process after it is received by the SoC 706.

Figure 8:
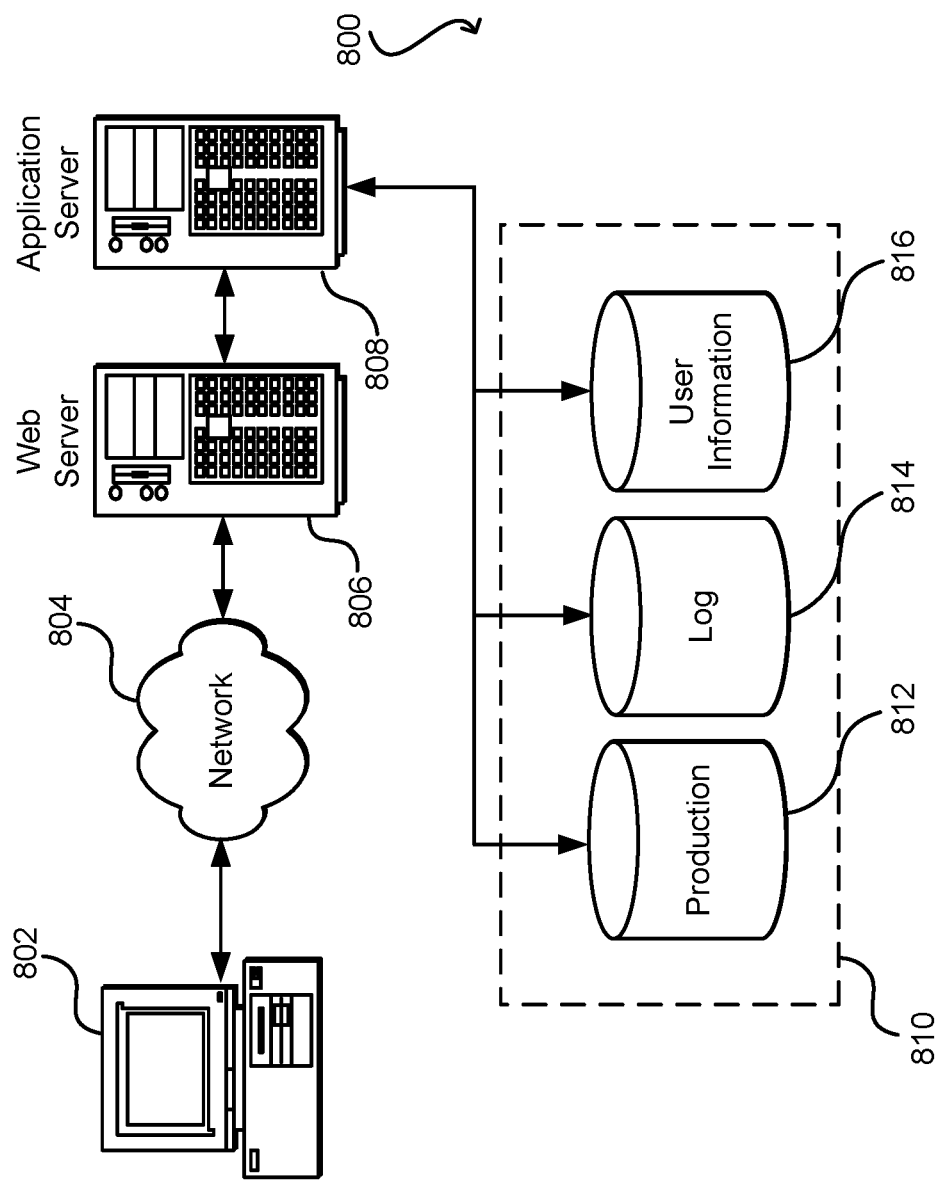
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Figure 9:
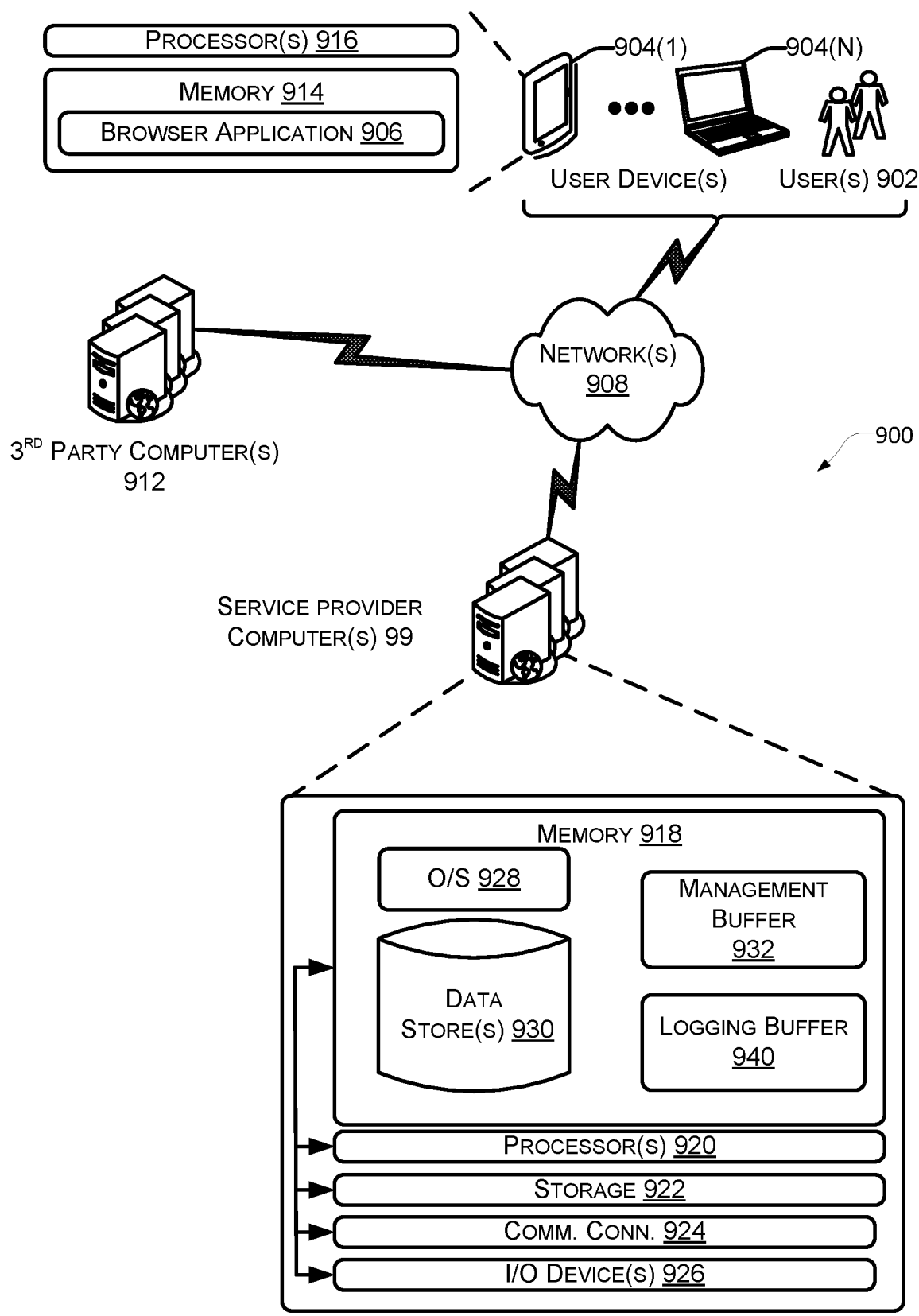
FIG. 9 illustrates an exemplary architecture for features and systems described herein that includes one or more service provider computers and/or a user device connected via one or more networks, according to at least one exemplary embodiment.

FIG. 9 illustrates an exemplary architecture for features and systems described herein that includes one or more service provider computers and/or a user device connected via one or more networks, according to at least one exemplary embodiment. The devices discussed in FIGS. 1-14, may use one or more components of the computing devices described in FIG. 9 or may represent one or more computing devices described in FIG. 9. In the illustrated architecture 900, one or more users 902 may use user computing devices 904(1)-(N) to access an application 906 (e.g., a web browser or mobile device application), via one or more networks 908. In some aspects, the application 906 may be hosted, managed and/or provided by a computing resources service or service provider. One or more service provider computers 910 may provide a native application which is configured to run on the user devices 904 which user(s) 902 may interact with. The service provider computer(s) 910 may, in some examples, provide computing resources such as, but not limited to, client entities, low latency data storage, durable data storage, data access, management, virtualization, cloud-based software solutions, electronic content performance management, etc. The service provider computer(s) 910 may also be operable to provide web hosting, computer application development and/or implementation platforms, combinations of the foregoing or the like to the user(s) 902. The service provider computer(s) 910, in some examples, may communicate with one or more third party computers 912.

In some examples, network(s) 908 may include any one or a combination of many different types of networks, such as cable networks, the Internet, wireless networks, cellular networks and other private and/or public networks. While the illustrated example represents the user(s) 902 accessing an application 906 over the network(s) 908, the described techniques may equally apply in instances where the user(s) 902 interact with the service provider computer(s) 910 via user device(s) 904 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 906 may allow the user(s) 902 to interact with the service provider computer(s) 910 such as to access web content (e.g., web pages, music, video, etc.). The service provider computer(s) 910, which may be arranged in a cluster of servers or as a server farm, may host the application 906 and/or cloud-based software services. Other server architectures may also be used to host the application 906. The application 906 may be capable of handling requests from many users 902 and serving, in response, various item web pages. The application 906 can provide any type of website that supports user interaction, including social networking sites, online retailers, informational sites, blog sites, search engine sites, news and entertainment sites and so forth. As discussed above, the described techniques can similarly be implemented outside of the application 906, such as with other applications running on the user device(s) 904.

The user device(s) 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 904 may be in communication with the service provider computer(s) 910 via the network(s) 908, or via other network connections. Additionally, the user device(s) 904 may be part of the distributed system managed by, controlled by or otherwise part of the service provider computer(s) 910 (e.g., a console device integrated with the service provider computers 910).

In one illustrative configuration, a user device(s) 904 may include at least one memory 914 and one or more processing units (or processor(s) 916). The processor(s) 916 may be implemented as appropriate in hardware, computer-executable instructions, firmware, or combinations thereof. Computer-executable instruction or firmware implementations of the processor(s) 916 may include computer-executable or machine-executable instructions written in any suitable programming language to perform the various functions described. The user device(s) 904 may also include geo-location devices (e.g., a global positioning system (GPS) device or the like) for providing and/or recording geographic location information associated with the user device(s) 904.

The memory 914 may store program instructions that are loadable and executable on the processor(s) 916, as well as data generated during the execution of these programs. Depending on the configuration and type of the user device(s) 904, the memory 914 may be volatile (such as random access memory (RAM)) and/or non-volatile (such as read-only memory (ROM), flash memory, etc.). The user device(s) 904 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 914 may include multiple different types of memory, such as static random access memory (SRAM), dynamic random access memory (DRAM), or ROM.

Turning to the contents of the memory 914 in more detail, the memory 914 may include an operating system and one or more application programs or services for implementing the features disclosed herein including at least a user provided input element or electronic service web page, such as via a browser application 906 or dedicated applications (e.g., smart phone applications, tablet applications, etc.). The browser application 906 may be configured to receive, store and/or display a website or other interface for interacting with the service provider computer(s) 910. Additionally, the memory 914 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 904.

In some aspects, the service provider computer(s) 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 910 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 910 may be in communication with the user device(s) 904 and/or other service providers via the network(s) 908, or via other network connections. The service provider computer(s) 910 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 910 may include at least one memory 918 and one or more processing units (or processor(s) 920). The processor(s) 920 may be implemented as appropriate in hardware, computer-executable instructions, firmware or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the service provider computer(s) 910, the memory 918 may be volatile (such as RAM) and/or non-volatile (such as ROM, flash memory, etc.). The service provider computer(s) 910 or servers may also include additional storage 922, which may include removable storage and/or non-removable storage. The additional storage 922 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 918 may include multiple different types of memory, such as SRAM, DRAM, or ROM.

The memory 918, the additional storage 922, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 918 and the additional storage 922 are all examples of computer storage media. Additional types of computer storage media that may be present in the service provider computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 910. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 910 may also contain communications connection(s) 924 that allow the service provider computer(s) 910 to communicate with a stored database, another computing device or server, user terminals and/or other devices on the network(s) 908. The service provider computer(s) 910 may also include I/O device(s) 926, such as a keyboard, a mouse, a pen, a voice input device, a touch input device, a display, speakers, a printer and the like.

The memory 918 may include an operating system 928, one or more data stores 930 and/or one or more application programs or services for implementing the features disclosed herein, including a management buffer 932 and a logging buffer 940. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus, comprising:
a first network interface port and a second network interface port: one or more processors coupled to the first network interface port and the second network interface port, and configured to:
execute a first set of instructions to operate in a first switching mode using a first memory resource of the apparatus to transmit control packets via the first network interface port to a first network device; and
execute a second set of instructions to operate in a second communication mode using a second memory resource of the apparatus to transmit communication data packets via the second network interface port to other network devices,
wherein the first memory resource is inaccessible to the one or more processors in the second communication mode: and
wherein both the first memory resource and the second memory resource are accessible to the one or more processors in the first switching mode to enable the one or more
processors to access the communication data packets in the first switching mode;
wherein the one or more processors are configured to receive a first interrupt and a second interrupt; and
wherein the first interrupt has a higher priority than the second interrupt.

2. The apparatus of claim 1, wherein the first memory resource includes a first memory device that is housed within an integrated circuit chip together with the one or more processors; and
wherein the second memory resource includes a second memory device that is external to the integrated circuit chip.

3. The apparatus of claim 1, wherein the first memory resource includes a first region of a memory device; and
wherein the second memory resource includes a second region of the memory device.

4. The apparatus of claim 1, wherein the first memory resource includes a static random access memory (SRAM) device; and
wherein the second memory resource includes one of: an SRAM device or a dynamic random access memory (DRAM) device.

5. The apparatus of claim 1, wherein the first memory resource is isolated from the second memory resource using a virtualization technique.

6. The apparatus of claim 5, wherein the virtualization technique includes:
mapping first virtual addresses accessed by the one or more processors when executing the first set of instructions to first physical addresses associated with the first memory resource; and
mapping second virtual addresses accessed by the one or more processors when executing the second set of instructions to second physical addresses associated with the second memory resource.

7. The apparatus of claim 5, wherein the virtualization technique is implemented by a hypervisor residing in a memory device included in the first memory resource.

8. The apparatus of claim 1, wherein the processor is one or more processors are configured to, responsive to receiving the first interrupt when executing the second set of instructions:
suspend the execution of the second set of instructions; and execute the first set of instructions.

9. The apparatus of claim 1, wherein the processor is one or more processors are configured to, responsive to receiving the first interrupt and the second interrupt: execute the first set of instructions; after execution of the first set of instructions completes, execute the second set of instructions.

10. The apparatus of claim 1, wherein the first network interface port and the second network interface port are operated via same network protocol.

11. The apparatus of claim 1, wherein the first network device comprises a network management processor configured to provide at least one of: diagnosing of a fault condition at a network device, or remedying the fault condition.

12. The apparatus of claim 1, wherein the one or more processors, the first network interface port, and the second network interface port are included in a system-on-chip (SoC) comprising a single integrated circuit chip.

13. The apparatus of claim 1, wherein one or more processors comprise a first processor and a second processor;
wherein the first set of instructions is executed by the first processor;
wherein the second set of instructions is executed by the second processor; and
wherein the first memory resource is inaccessible to the second processor.

14. A method, comprising:
executing, using one or more processors, a first set of instructions to operate in a first switching mode using a first memory resource to transmit control packets via a first network port to a first network device; and
executing, using the one or more processors, a second set of instructions to operate in a second communication mode using a second memory resource to transmit communication data packets via a second network port to other network devices,
wherein the first memory resource is inaccessible to the processor one or more processors in the second communication mode; and
wherein both the first memory resource and the second memory resource are accessible to the one or more processors in the first switching mode to enable the one or more
processors to access the communication data packets in the first switching mode;
wherein the one or more processors are configured to receive a first interrupt and a second interrupt; and
wherein the first interrupt has a higher priority than the second interrupt.

15. A non-transitory computer readable medium comprising:
a first set of instructions that, when executed by one or more processors, causes the processor one or more processors to operate in a first switching mode using a first memory resource to transmit control packets via a first network port to a first network device; and
a second set of instructions that, when executed by the one or more processors, causes the one or more processors to operate in a second communication mode using a second memory resource to transmit communication data packets via a second network port to other network devices,
wherein the first memory resource is inaccessible to the processor one or more processors in the second communication mode; and
wherein both the first memory resource and the second memory resource are accessible to the one or more processors in the first switching mode to enable the one or more
processors to access the communication data packets in the first switching mode;
wherein the one or more processors are configured to receive a first interrupt and a second interrupt; and
wherein the first interrupt has a higher priority than the second interrupt.

16. The method of claim 14, wherein the first memory resource is accessible by the one or more processors only in the first switching mode or in response to receiving the first interrupt.

17. The apparatus of claim 1, wherein the control packets conform to Internet Control Message Protocol (ICMP).

* * * * *

UNITED STATES PATENT AND TRADEMARK OFFICE
CERTIFICATE OF CORRECTION

PATENT NO. : 10,917,362 B1  
APPLICATION NO. : 16/009141  
DATED : February 9, 2021  
INVENTOR(S) : Tzachi Zidenberg, Barak Wasserstrom and Guy Zalik Page 1 of 1

It is certified that error appears in the above-identified patent and that said Letters Patent is hereby corrected as shown below:

In the Claims

Column 24, Line 51: change "The apparatus of claim 1, wherein the processor is one" to --The apparatus of claim 1, wherein the one--.

Column 24, Line 57: change "The apparatus of claim 1, wherein the processor is one" to --The apparatus of claim 1, wherein the one--.

Column 25, Line 28: change "processor one or more processors in the second" to --one or more processors in the second--.

Column 26, Line 6: change "more processors, causes the processor one or more" to --more processors, causes the one or more--.

Column 26, Line 17: change "processor one or more processors in the second" to --one or more processors in the second--.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*